(12) United States Patent
Hummel et al.

(10) Patent No.: US 10,609,868 B2
(45) Date of Patent: Apr. 7, 2020

(54) MODULE WRAP GUIDE ARRANGEMENT

(71) Applicant: DEERE & COMPANY, Moline, IL (US)

(72) Inventors: Justin E. Hummel, Des Moines, IA (US); Kevin J. Goering, Cambridge, IA (US)

(73) Assignee: Deere & Company, Moline, IL (US)

( * ) Notice: Subject to any disclaimer, the term of this patent is extended or adjusted under 35 U.S.C. 154(b) by 632 days.

(21) Appl. No.: 14/729,971

(22) Filed: Jun. 3, 2015

(65) Prior Publication Data
US 2016/0353665 A1 Dec. 8, 2016

(51) Int. Cl.
*A01F 15/07* (2006.01)
*B65B 41/12* (2006.01)

(52) U.S. Cl.
CPC ........ *A01F 15/071* (2013.01); *A01F 15/0715* (2013.01); *B65B 41/12* (2013.01)

(58) Field of Classification Search
CPC ...... B41F 33/18; B41F 33/00; B41P 2233/20; A01F 15/07; A01F 15/14; A01F 15/18; A01F 15/071; A01F 15/0715; B65B 41/12
USPC ...... 53/118, 399, 430, 587, 389.4; 100/5, 88
See application file for complete search history.

(56) References Cited

U.S. PATENT DOCUMENTS

| 5,129,207 | A | * | 7/1992 | Butler | A01F 15/0715 53/118 |
| 6,928,792 | B1 | * | 8/2005 | Viesselmann | A01F 15/0715 220/557 |
| 9,474,212 | B2 | * | 10/2016 | Paillet | A01F 15/0715 |
| 2006/0242931 | A1 | * | 11/2006 | Ryse | A01F 15/0715 53/587 |
| 2012/0204735 | A1 | | 8/2012 | Claeys et al. | |

FOREIGN PATENT DOCUMENTS

| EP | 1010530 | | 6/2000 | |
| EP | 1010530 A2 | * | 6/2000 | .............. B41F 33/00 |

OTHER PUBLICATIONS

Brazilian Search Report issued in counterpart Brazilian Patent Application No. 102016012495-6 dated Oct. 1, 2019 (4 pages).

* cited by examiner

*Primary Examiner* — Chelsea E Stinson
*Assistant Examiner* — Mary C Hibbert-Copeland
(74) *Attorney, Agent, or Firm* — Klintworth & Rozenblat IP LLP

(57) ABSTRACT

A wrap guide arrangement is provided for an agricultural harvesting machine having a module-forming chamber and wrapping system having a source of a wrapping material and a wrap conveyor arrangement for guiding the wrapping material from the source to the conveyor arrangement. The wrap guide arrangement has a wrap roll extending along an axis of rotation and having an outer circumference receiving the wrapping material. A guide plate has an axially extending body and at least one finger extending from the body toward the wrap roll. At least a part of the at least one finger extends proximate the outer circumference of the wrap roll between the wrap roll and the wrapping material.

10 Claims, 9 Drawing Sheets

MODULE WRAP GUIDE ARRANGEMENT

CROSS-REFERENCE TO RELATED APPLICATION(S)

Not Applicable.

STATEMENT REGARDING FEDERALLY SPONSORED RESEARCH

Not Applicable.

FIELD OF THE DISCLSOURE

This disclosure relates to crop harvesting machines with baling and wrapping arrangements, and more specifically, to limiting wrap mis-feed during a wrapping cycle.

BACKGROUND OF THE DISCLOSURE

Harvested cotton, hay or other crops, or crop by-products such as straw, may be collected and processed through a module-forming apparatus, such as a baler, to produce modules (e.g., round or square bales) of the harvested crop or crop by-products. The module-forming apparatus may be equipped with a wrapping system to bind the module together with wrap material (e.g., twine, net, sheet wrap, etc.). For example, U.S. Pat. No. 6,263,650 discloses a cotton harvesting machine having a round module-forming and wrapping apparatus. The wrapped module may then be transferred from the module-forming apparatus such that the formation of a new module may begin. The wrapped module may be temporarily retained on the harvesting machine before being ejected at a given location, such as at the end of a row in a field of crops, for later transport.

The module-forming and wrapping apparatus may utilize individual, properly sized wraps. The apparatus may also have the capability of separating a predetermined length of wrapping material from a supply roll for applying a desired number of layers of wrap to the module. For example, U.S. Pat. No. 6,787,209 discloses separating pre-partitioned lengths of wrapping material from the supply roll. Other systems may measure the length of continuous wrapping material (e.g., via timers, position sensors, rotation counters, and the like), and thereby determine where to cut the wrapping material from the supply roll.

One challenge arising in module wrapping relates to mis-feeding of the wrapping material. For example, the wrapping material may be improperly guided into the module-forming chamber, or the wrapping material may become incorrectly oriented, folded, or otherwise positioned out of alignment. As a consequence, a module may improperly wrapped or not at all. These mis-wrap events may also result in equipment down time, wasted wrapping material, and exposure of the modules to dirt, moisture, and the like when ejected from the harvesting machine.

SUMMARY OF THE DISCLOSURE

This disclosure provides a module-forming and wrapping system for agricultural harvesting machines which guides the wrapping material during a wrapping operation to prevent or reduce the occurrence of certain mis-feed events.

In one aspect the disclosure provides a wrap guide arrangement having a source of a wrapping material and a wrap conveyor arrangement for guiding the wrapping material from the source to the conveyor arrangement. The wrap guide arrangement includes a wrap roll and a guide plate. The wrap roll extends along an axis of rotation and has an outer circumference receiving the wrapping material. The guide plate has an axially extending body and at least one finger extending from the body toward the wrap roll. The at least one finger extends proximate the outer circumference of the wrap roll between the wrap roll and the wrapping material.

In another aspect the disclosure provides a wrap delivery arrangement having a source of a wrapping material, a wrap conveyor arrangement, a wrap roll, and a wrap guide. The wrap roll may be positioned intermediate the source of the wrapping material and the wrap conveyor arrangement for guiding the wrapping material from the source to the wrap conveyor arrangement. The wrap roll may have at least one groove formed in an outer circumference of the wrap roll. The wrap guide may be positioned forward of the wrap roll in a feed direction of the wrap material. The wrap guide may have a guide plate with an elongate body and at least one finger extending from the body toward the wrap roll. The at least one finger may extend into the at least one groove of the wrap roll between the wrap roll and the wrapping material.

In yet another aspect the disclosure provides an agricultural harvesting machine having a module-forming arrangement disposed in a module-forming chamber. The machine may have a wrapping material supply roll, a wrap conveyor arrangement for delivering wrapping material from the wrapping material supply roll to the module-forming arrangement, a wrap roll and a wrap guide. The wrap roll may have at least one groove formed in an outer circumference of the wrap roll. The wrap guide may be positioned forward of the wrap roll in a feed direction of the wrap material. The wrap guide may have a guide plate with an elongate body and at least one finger extending from the body toward the wrap roll. The at least one finger may extend into the at least one groove of the wrap roll between the wrap roll and the wrapping material.

These and other aspects and advantages of the disclosure will become better understood upon consideration of the detailed description of the drawings.

BRIEF DESCRIPTION OF THE DRAWINGS

Like reference numerals will be used to refer to like parts from figure to figure in the following detailed description.

DETAILED DESCRIPTION

Figure 1:
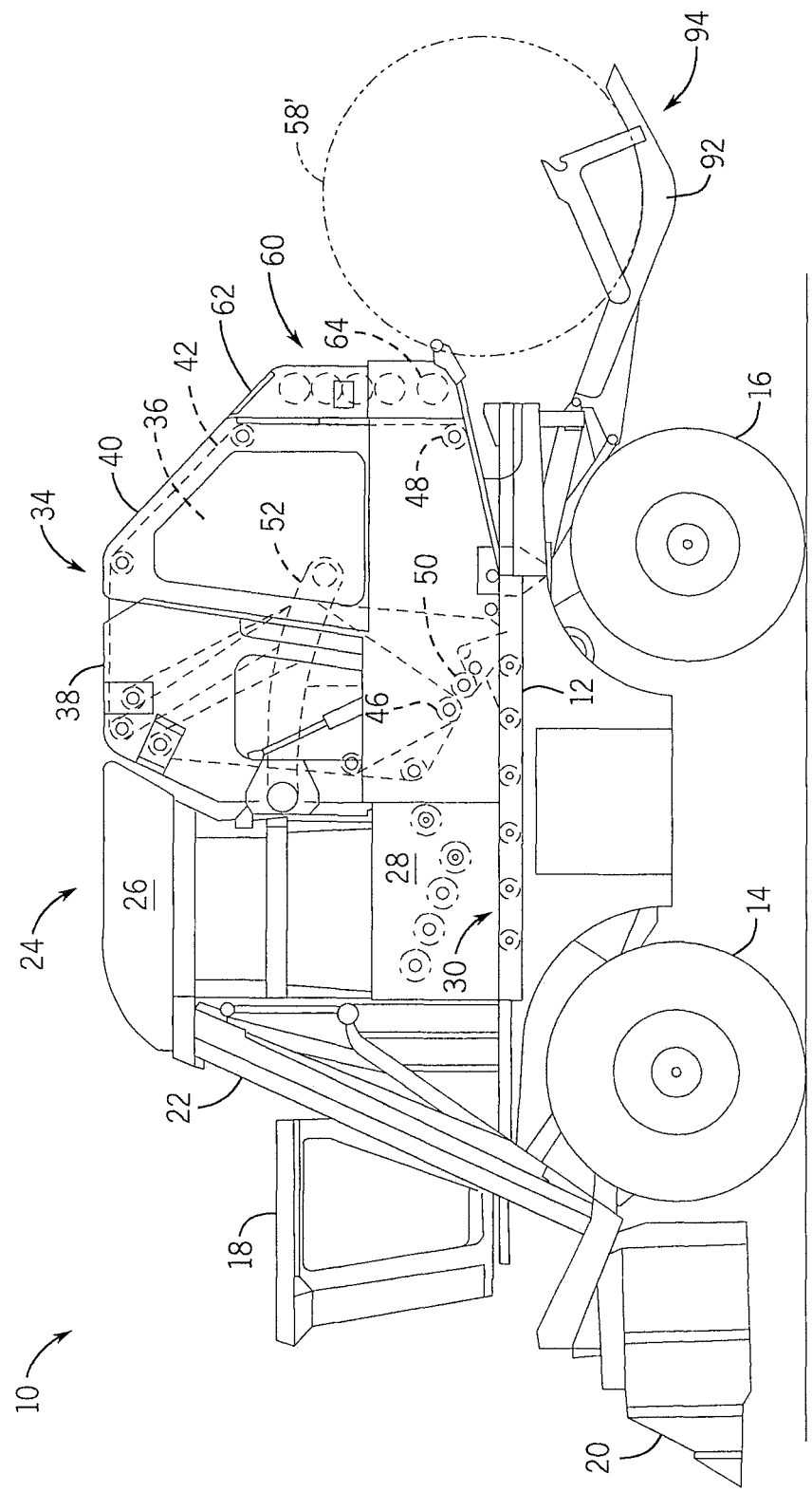
FIG. 1 is a schematic side view of an example crop harvesting machine in the form of a cotton harvester, which has a round module-forming and wrapping system.

The following describes one or more example embodiments of the disclosed module-forming and wrapping system, as illustrated in the accompanying figures of the drawings described briefly above. Various modifications to the example embodiments may be contemplated by one of skill in the art, and it should be understood that the disclosed system may be used with a variety of vehicles in a variety of settings.

As discussed above, in various situations it may be useful to provide a module-forming arrangement for bundling crop material during harvesting. For example, it may be useful to form a chamber defining an interior space with an inlet for receiving crop material therein. The module-forming arrangement and chamber may be configured to form modules having circular (i.e., round bales) or rectangular sections (i.e., square bales). For example, a round module-forming arrangement may be positioned about a circumference of the chamber for forming a round bale. Further, it may be useful to provide a wrap delivery arrangement for guiding a wrapping material about the module to bind the module together for later transport as well as to protect the crop material from debris, moisture or other elements during or after the harvesting process.

One example of a wrap delivery system includes a wrapping material supply roll and one or more wrap rolls for guiding the wrapping material from the supply roll to the module-forming chamber. The wrapping material may pass from the supply roll, around the wrap rolls, and into the module-forming chamber. Upon entering the module-forming chamber, the wrapping material may be guided around an outer surface of the module of crop material. Thereafter, the wrapped module may be transferred from the module-forming chamber.

In certain situations, it is possible for the wrapping material to be improperly guided into the module-forming chamber or around the module during a wrapping operation. A mis-wrap event may include any occurrence in which a wrapping material deviates from a predetermined path between a supply roll and the module-forming arrangement, including the processes of feeding wrapping material to the module as well as wrapping the module. A mis-wrap event may further include any occurrence in which a module of crop material is improperly wrapped (e.g., incompletely wrapped or unwrapped). For example, a mis-wrap event may result in the accumulation of wrapping material in or around one or more components of the module-forming arrangement or wrap delivery system. One possible outcome of a mis-feed event is that the wrapping material may become caught on or wound around a wrap roll of the wrap delivery system instead of being properly fed into the module-forming chamber. As a result, a module may be only partially wrapped or completely unwrapped, and the wrapping material may be damaged or wasted, as well as various other problems that may also arise during or after a wrapping operation.

A wrap guide system may aid in properly feeding wrapping material to the module, and thus in properly wrapping the module. As one example, a wrap guide system may include a guide plate having a plurality of fingers. The guide plate may be mounted such that the fingers extend towards an outer surface of a roll of wrapping material. The wrap roll may include a series of axially spaced grooves formed about a circumference of the wrap roll. The fingers of the guide plate may extend at least partially into the grooves.

The fingers may be bent an angle relative to the guide plate such that a distal section of the fingers may approach tangent to a surface of the wrap roll. The grooves may be sized to receive the fingers of the guide plate without contacting the fingers. In the case that the fingers contact the wrap roll during a wrapping operation, the orientation of the fingers relative to the wrap roll may reduce vibrations or mechanical disturbances (e.g., shaking, shuddering, rattling, and the like) relative to an arrangement of the fingers that may not be tangent to the surface of the wrap roll.

In operation, a leading edge of the wrapping material may travel around the outer surface of the guide roll. In the case that the distal sections of the fingers are received within the grooves of the wrap roll, the outer surface of the finger may be about even with, or radially inward from, the outer surface of the wrap roll. Accordingly, the edge of the wrapping material may pass over the distal ends of the fingers. As the edge of the wrapping material continues around the wrap roll, the wrapping material may be guided outward from the surface of the wrap roll by the fingers and the guide plate in general. In one aspect, the guide plate may prevent or impede the wrap material from making a full turn about the surface of the wrap roll, thereby reducing the chance that the wrapping material may become caught on or wound around the wrap roll. Further embodiments of a wrap guide system may be similarly employed, as will be described herein.

Figure 2:
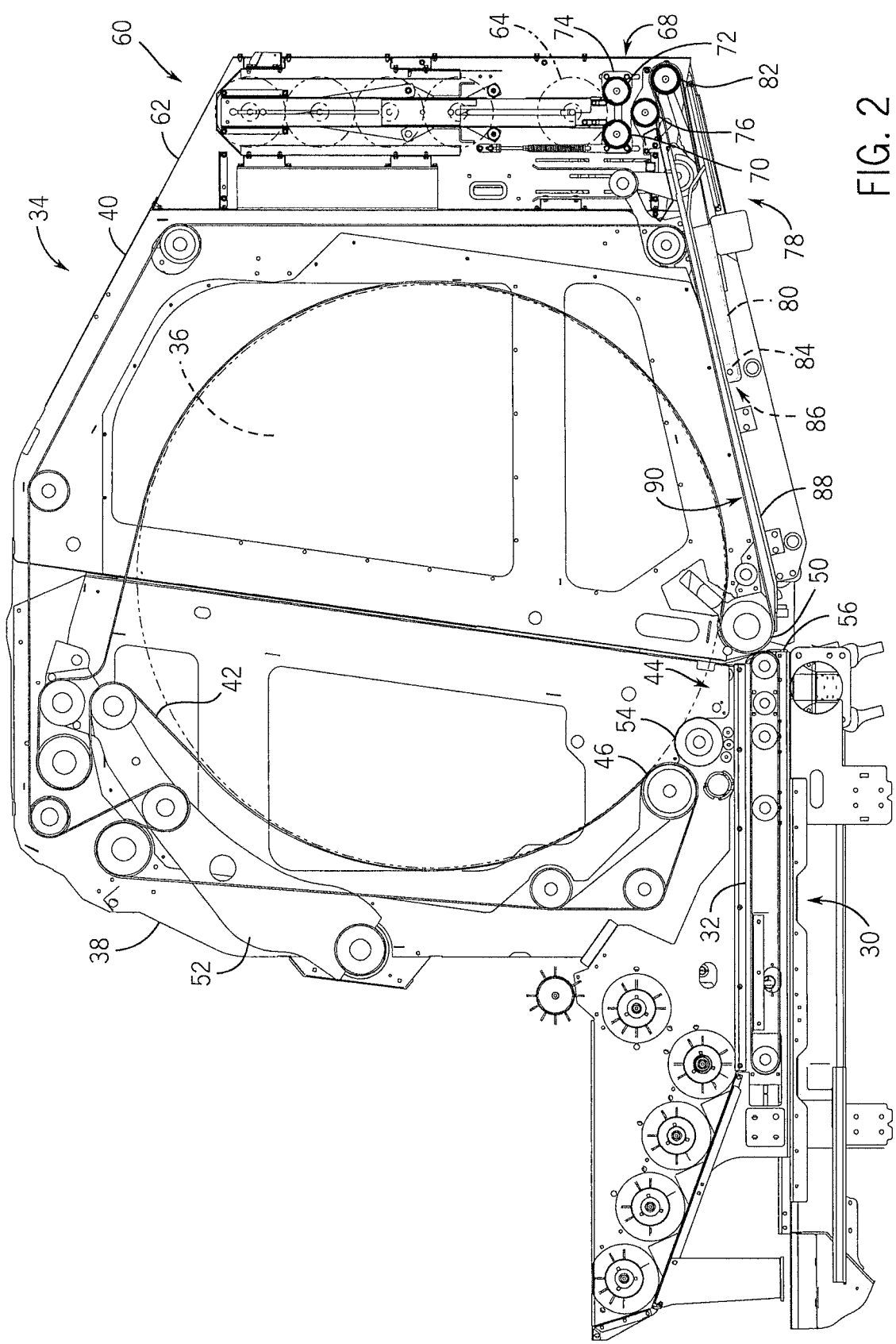
FIG. 2 is an enlarged side view of the round module-forming and wrapping system of the cotton harvester of FIG. 1.

Referring now to FIGS. 1 and 2, there is shown a self-propelled cotton harvester 10 including a chassis frame 12 supported for movement by front drive wheels 14 and rear steerable wheels 16. An operator's station or cab 18 is supported at an elevated forward location of the frame 12 so as to provide an operator a clear view of a harvesting head 20 mounted to a forward end of the frame 12. As is understood, the harvesting head 20 operates to remove cotton bolls from cotton plants, either in a picking or stripping action, and direct the removed cotton bolls into an air conveying system including an air duct arrangement 22 leading to an accumulator 24 with an upper inlet structure 26 and a metering floor 28 supported on the frame 12 behind the cab 18 for receiving the cotton. Beneath the metering floor 28 is a substantially horizontal belt conveyor arrangement 30 including an endless feed belt arrangement 32 (see FIG. 2) that conveys the cotton to an onboard round module-forming (or baler) arrangement 34, which is supported on the frame 12 at a location rearward of the accumulator 24 and is operable for forming large cylindrical modules of harvested cotton.

The module-forming arrangement 34 may include a module-forming chamber 36 of suitable size and shape. Specifically, the module-forming chamber 36 may include a fixed front section 38 mounted to the main frame 12, and a rear section in the form of a discharge gate 40. The gate 40 may have an upper front location mounted to an upper rear location of the front section 38 so as to establish a pivot assembly defining a generally horizontal transverse pivot axis about which the discharge gate 40 may pivot. Any suitable actuator may actuate the gate 40, for example a hydraulic cylinder assembly (not shown), which can move the gate 40 between a lowered baling position, as shown in FIG. 1, and a raised discharge position (not shown) permitting a completed and wrapped cotton module to be discharged beneath it.

With continued reference to FIGS. 1 and 2, the periphery of the module-forming chamber 36 may be defined by the module-forming arrangement 34. For example, the module-forming arrangement 34 may include a plurality of endless members, such as belts 42, for example, formed of one or more sections having ends spliced or pinned together to form a loop, supported in side-by-side relationship across a support roll arrangement of fixed and movable support rolls. Specifically, near an inlet 44 at the bottom of the module-forming chamber 36, the support roll arrangement includes a stationary lower forward roll 46, a stationary bottom rear gate roll 48 and a stationary bottom front gate roll 50 all extending between and having opposite ends rotatably mounted to the front section 38 or the gate 40 at the sides of the module-forming arrangement 34. The module-forming arrangement 34 also includes a belt tensioning arm 52 mounted within the module-forming chamber 36.

In an initial position corresponding to when the module-forming chamber 36 is in an empty condition, the module-forming belts 42 define the perimeter of the chamber 36, which is initially a generally triangular shape, as viewed from the side. The tensioning arm arrangement 52 may include tensioning elements (not shown) so as to yieldably resist their upward movement as the module-forming chamber 36 becomes filled with cotton. One or more of the fixed rolls are driven so as to cause the belts 42 to be driven, with the drive direction being such as to cause the incoming cotton to travel counterclockwise as it is added as a spiral layer to the growing cotton module. To aid in this counterclockwise movement of the cotton during initial formation of the module, a driven starter roll 54 extends between a front module-forming chamber section. As viewed in FIG. 2, the starter roll 54 is driven clockwise so as to strip the cotton conveyed by the downwardly traveling run of the module-forming belts 42 forming the front of the triangular shaped space, with the result that the cotton is rolled into a cylinder, which grows and expands against the tensioned belts until a module of a desired diameter is formed.

Figure 3:
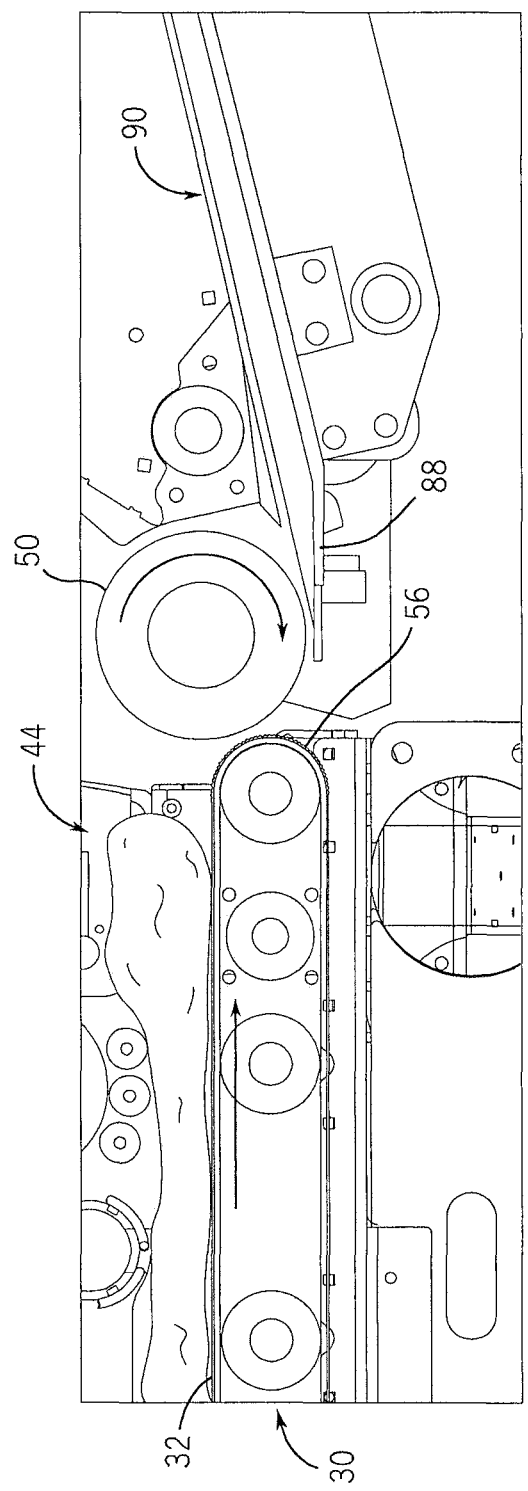
FIG. 3 is an enlarged partial side view showing an inlet to a module-forming chamber.
Figure 5:
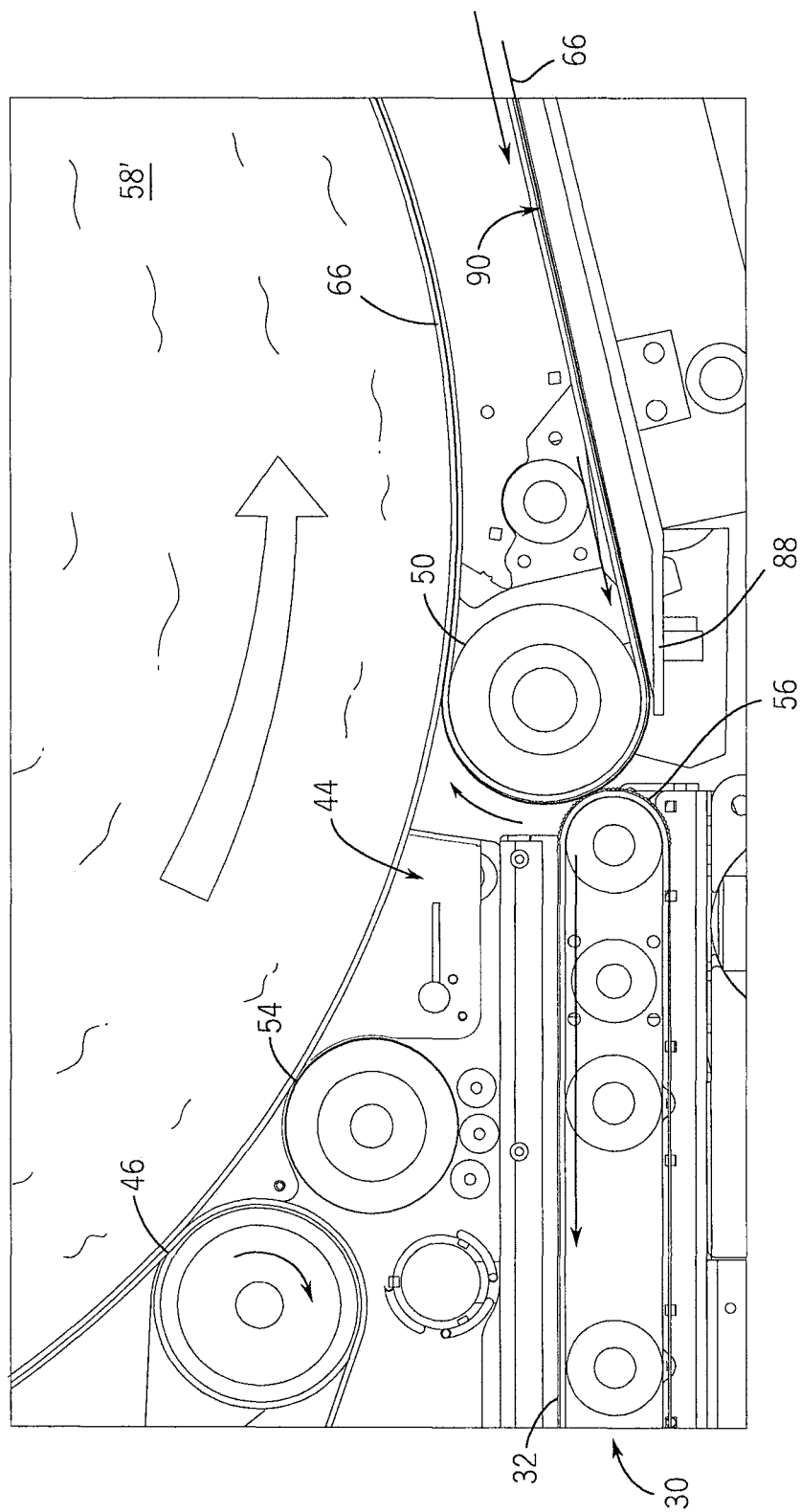

As can be seen in FIGS. 2, 3 and 5, the conveyor arrangement 30 has a rear terminal end 56 located adjacent a front periphery of the lower front gate roll 50 so that cotton is conveyed directly against the module-forming belts 42 engaged with the roll 50. When the discharge gate 40 is in its lowered, baling position, as shown in FIGS. 1 and 2, the forward roll 46 and the starter roll 54 of the fixed front chamber section 38 are each located at a height above the height of the lower front gate roll 50, with the rolls 46, 50 and 54 being located so that their peripheries are located to engage the circumference of a completed cotton module 58 located in the module-forming chamber 36.

Figure 4:
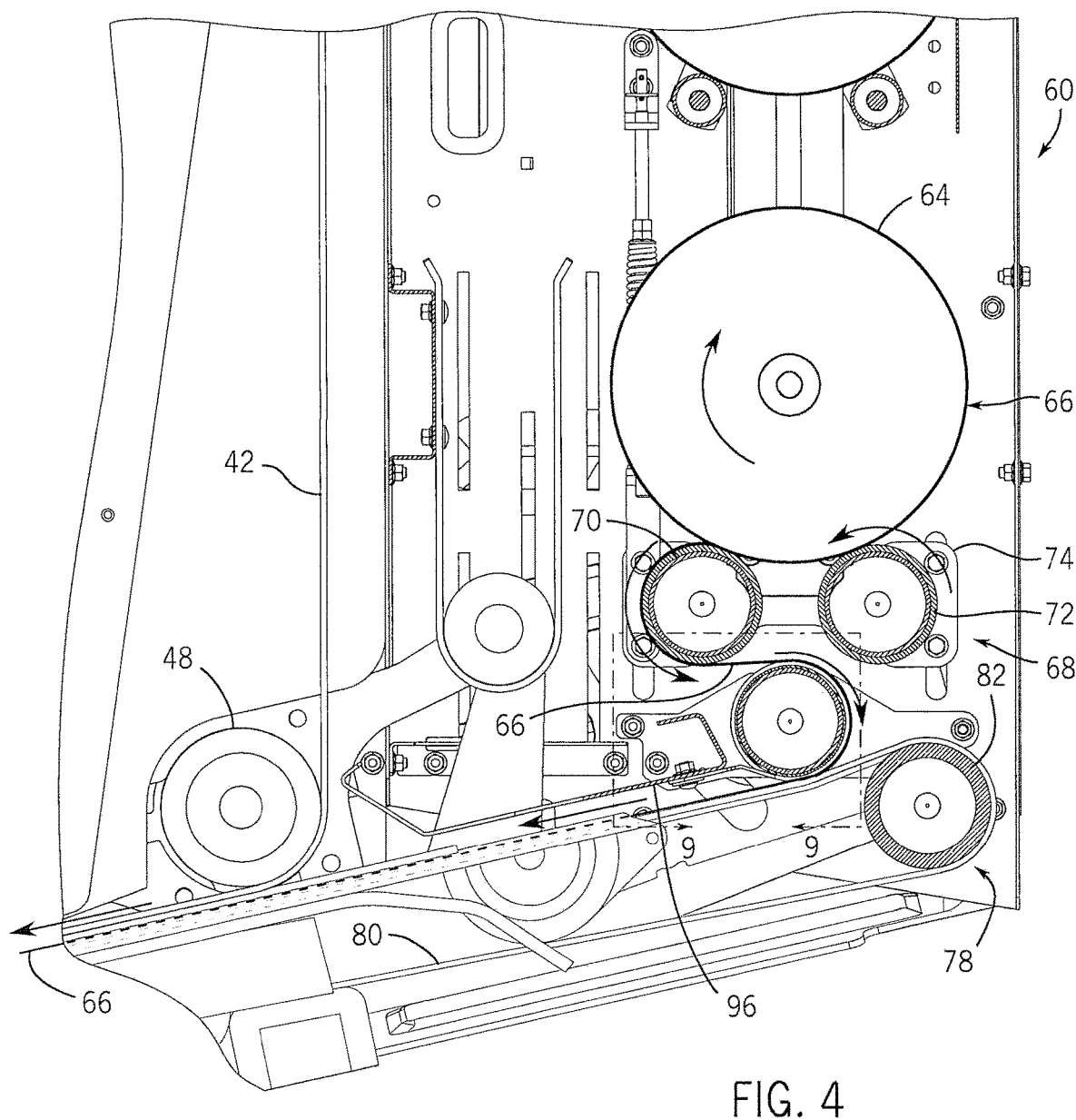
FIGS. 4 and 5 are partial side views showing wrap feed components of the wrapping system.

Referring to FIGS. 1 and 4, a module or bale wrapping system 60 is shown mounted at the rear of the discharge gate 40 for the purpose of wrapping the completed module of cotton 58 so as to hold it together and protect it from the elements once it is discharged from the module-forming chamber 36. The wrapping system 60 includes a cover 62 covering an active wrapping material supply roll 64 consisting of wrapping material 66. The wrapping material 66 may be any suitable wrapping material, such as including netting or sheet wrap.

With reference to FIGS. 1, 2 and 4, the supply roll 64 may be mounted on an upper wrap roller assembly 68 that includes a front upper wrap roll 70 and a rear upper wrap roll 72 mounted for rotation on a movable carriage 74. The supply roll 64 can be rotated in a clockwise direction as viewed in FIG. 3, such that an end section of wrapping material 66 may extend around a forward side of the front upper wrap roll 70 and be fed between the front upper wrap roll 70 and a lower wrap roll 76, which rotates about an axis of rotation "A" (see FIG. 7). The carriage 74 may be transitioned from a raised position (as shown in FIG. 4) to a lowered position (not shown) such that the front upper wrap roll 70 and the rear upper wrap roll 72 are in contact with the lower wrap roll 76.

The lower wrap roll 76 may be positioned above a wrap conveyor arrangement 78, including a plurality of endless wrap feed belts 80, that conveys the wrapping material 66 toward the module-forming chamber 36. The wrap feed belts 80 may be supported on rear wrap conveyor roll 82 and a front wrap conveyor roll 84. A forward section 86 of the wrap conveyor arrangement 78 may be positioned beneath a section of the module-forming belts 42 that extends between the bottom rear gate roll 48 and the bottom front gate roll 50.

Continuing toward the module-forming chamber 36, a wrap floor 88 may be positioned forward of the wrap conveyor arrangement 78 and beneath the section of module-forming belts 42 that extends between the bottom rear gate roll 48 and the bottom front gate roll 50. An upper face 90 of the wrap floor 88 may be generally aligned with the wrap feed belts 80. Accordingly, at the beginning of a wrapping cycle, the front upper wrap roll 70, rear upper wrap roll 72, and lower wrap roll 76 are actuated to deliver a length of wrapping material 66 against the wrap feed belts 80. The wrap material 66 may then be carried toward the forward section 86 of the wrap conveyor arrangement 78 where the wrapping material 66 is drawn between the module-forming belts 42 and the wrap feed belts 80. The module-forming belts 42 guide the wrapping material 66 along the belts of the wrap floor 88, and then around the lower front gate roll 50 proximate the terminal end 56 of the conveyor arrangement 30 and into the module-forming chamber 36, by way of the chamber inlet 44.

Upon entering the module-forming chamber 36, the length of wrapping material 66 is trapped between the module-forming belts 42 and the completed cotton module 58. The speed at which the wrapping material 66 is moved by the belts 42 and the rotating module 58 may be greater than the speed at which it is delivered by the wrap feed rolls 70, 72 and 76, causing the wrapping material 66 to be tensioned and stretched as it is wrapped about the module 58. Once a desired length of the wrapping material 66 (three wraps or revolutions, for example) is wrapped about the module 58, the wrap feed rolls 70, 72 and 76 are paused and the wrapping material 66 associated with the module 58 is separated from the remaining wrapping material 66 associated with the supply roll 64. In some embodiments, the wrapping material 66 may be cut, for example, with a knife, laser or other cutting implement. In other embodiments, a supply roll 64 may include pre-partitioned lengths of wrapping material 66.

In the case of pre-partitioned lengths of wrapping material 66, it is possible that adjacent segments of the wrapping material 66 may be interleaved together at a lapped joint, which may be connected together by an adhesive permitting separation of the joint upon the application of a predetermined tensile force without requiring a cutting mechanism. Rather, all that is required is to apply a braking force to the supply roll 64, with the wrapping action of the module 58 and module-forming belts 42 creating the tensile force necessary for separating the joint. Separation of the joint then exposes adhesive which serves to adhere the outer end section to the underlying layer of wrapping material 66. Further, each segment or pre-partitioned length of wrapping material 66 may be a predetermined length sufficient for providing a desired number of wraps about the circumference of a module 58 having a predetermined diameter. Thus, each of the wrapping material supply rolls 64 may be manufactured to wrap a given number of modules 58 having a predetermined diameter.

Upon completion of a wrapping cycle, a signal may be provided to a controller (not shown) located in the cab 18 of the harvester 10 for initiating transfer of the wrapped module 58' from the module-forming chamber 36. For example, the operator may cause a pair of hydraulic gate cylinders (not shown) to actuate and pivot the discharge gate 40 to its raised discharge position so that the wrapped module 58' may roll onto a cradle-shaped framework 92 of a module discharge arrangement 94. The module 58' may then be ejected from the cotton harvester 10 at a desired time and location.

Figure 6:
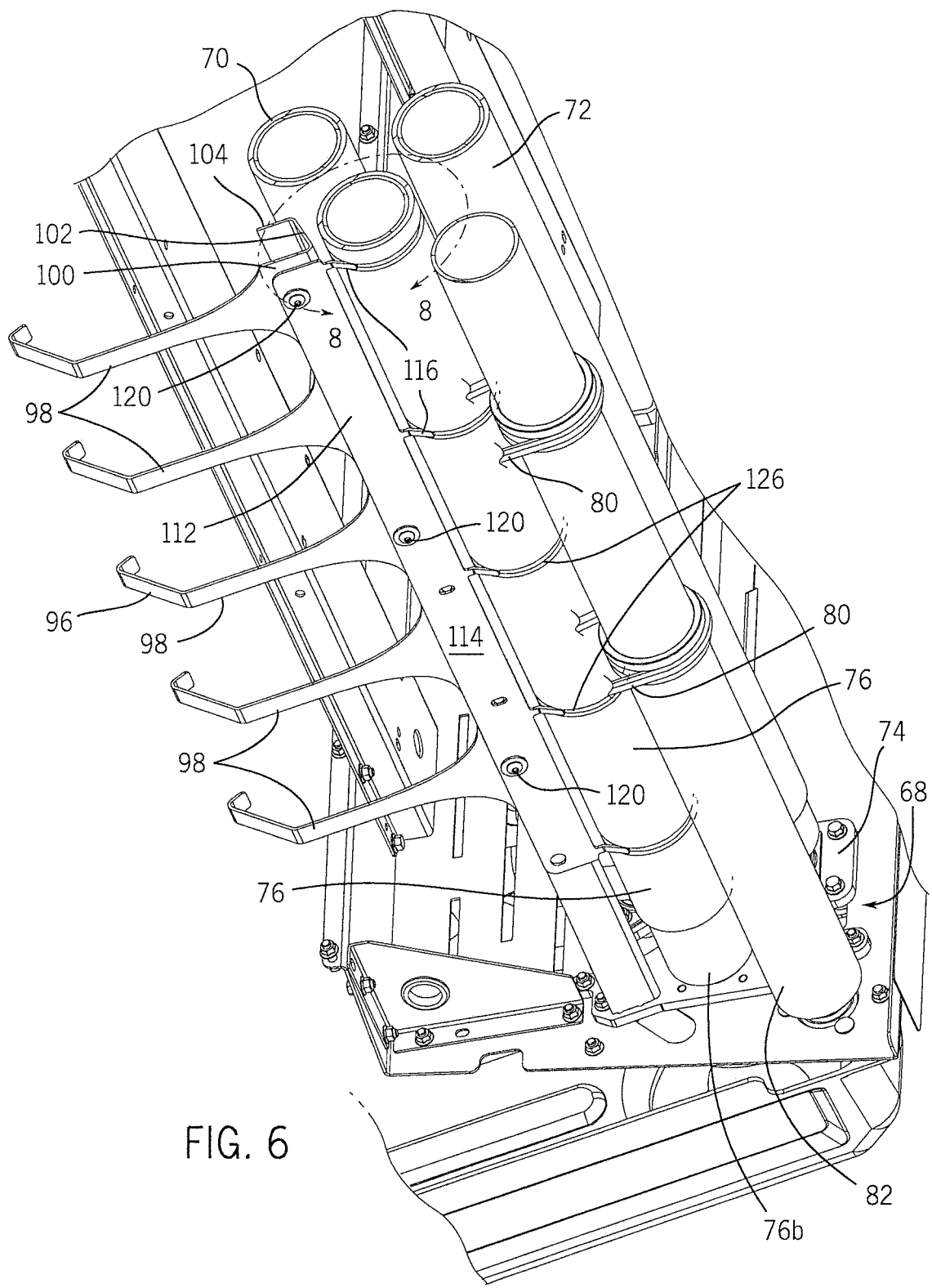
FIG. 6 is a partial bottom perspective view of certain wrap feed components of the wrapping system.
Figure 7:
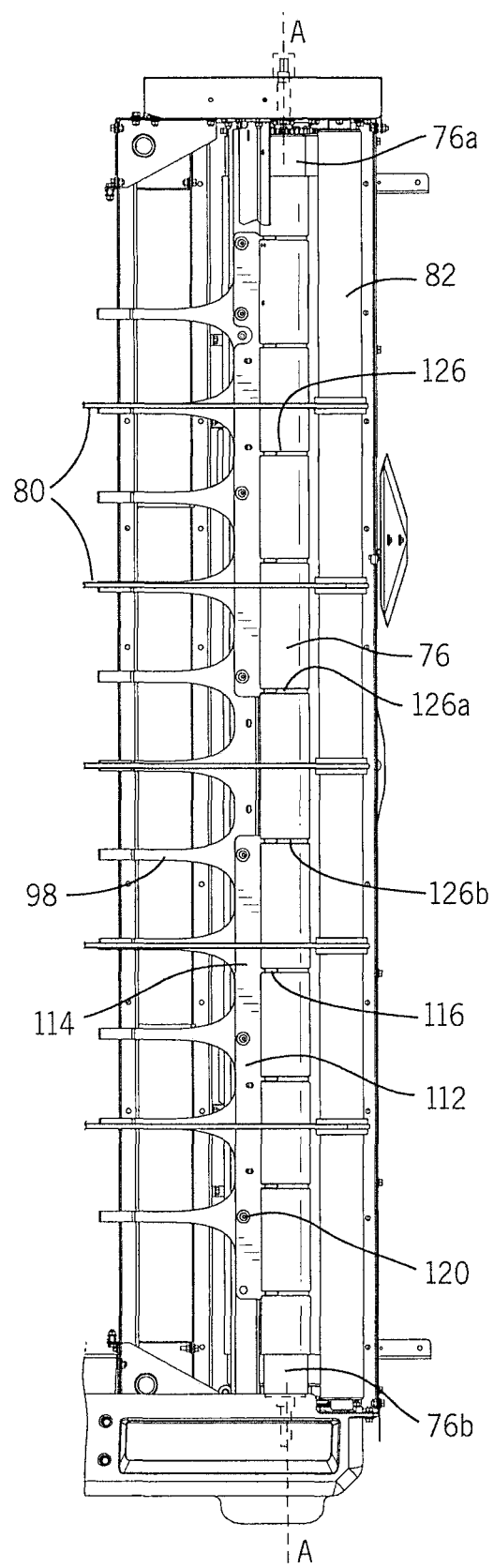
FIG. 7 is a bottom view thereof.
Figure 8:
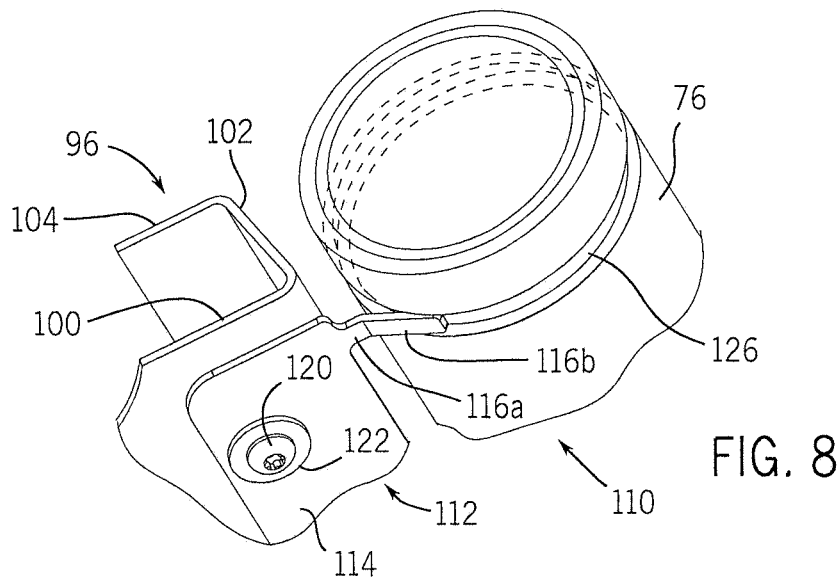
FIG. 8 is an enlarged partial perspective view of certain example wrap guide features as taken along arc 8-8 of FIG. 6.

Also referring to FIGS. 4 and 6-7, one example of a wrap guide 96 may include a plurality of transversely spaced runners 98 that extend above the wrap conveyor arrangement 78. The runners 98 may project from a base 100 of the wrap guide 96 in a longitudinal direction towards the module forming chamber 36 at a downward grade parallel to the wrap conveyor arrangement 78 and the wrap floor 88. The base 100 may transition into a side wall 102 that extends at an upright angle to the base 100. The side wall 102 may be generally oriented towards the lower wrap roll 76 and transition into a ceiling 104 that extends back towards the module-forming chamber at an angle to the side wall 102 and parallel to the base 100.

Together, the base 100 and each of the runners 98 form a ceiling above the wrap conveyor arrangement 78. Accordingly, as the wrapping material 66 transitions from the lower wrap roll 76 onto the wrap feed belts 80, the wrapping material 66 is guided between the wrap guide 96 and the wrap conveyor arrangement 78 toward the module-forming chamber 36. However, in certain situations, it may be possible for the wrapping material 66 to become impeded or caught at various points along the path of the wrapping material 66 between the supply roll 64 and the module-forming chamber 36. For example, the wrapping material 66 may become bunched or folded between the runners 98 and the wrap feed belts 80, or between the side wall 102 and the lower wrap roll 76. As described above, if the wrapping material 66 accumulates or becomes caught at these or other locations, there is the possibility that the wrapping material 66 may become caught on the lower wrap feed roll 76. As a consequence, the lower wrap feed roll 76 may wind up the wrapping material 66 pulling from the wrapping material 66 that has accumulated on the wrap floor 88, the wrapping material 66 feeding off the supply roll 64, or a combination thereof, which may result in winding several portions of wrapping material 66 around the lower wrap feed roll 76.

Turning now to FIGS. 6-11, an example embodiment of a wrap guide system 110 may be configured to prevent or reduce the occurrence of a wrap mis-feed event associated with the lower wrap roll 76. The wrap guide system 110 may include a guide plate 112 defining an elongate planar body 114 with a plurality of fingers 116 extending therefrom. The fingers 116 may each include a proximal section 116a and a distal section 116b. The proximal section 116a may extend outward from a long edge of the body 114. Further, the proximal section 116a may extend within the plane of the body 114, which plane extends to intersect with the lower wrap roll 76. The distal section 116b may be formed or bent at an angle ($\alpha$) to the proximal section 116a of the fingers 116. In one aspect, the body 114 and the fingers 116 may be formed (i.e., stamped or cut) from a sheet of material such as steel, aluminum, plastic, or another material, composite, or alloy. In the example case that the guide plate may be stamped or cut from a single sheet of steel having a substantially uniform thickness. Thereafter, the distal section 116b of the fingers 116 may be bent to the angle ($\alpha$) relative to the proximal section 116a. Accordingly, the guide plate 112 and the fingers 116 may formed as a unitary body of substantially uniform thickness.

The body 114 of the guide plate 112 may be mounted to a bottom face of the base 100 with the fingers 116 extending towards the lower feed roll 76. In one aspect, the body 114 may include a plurality of holes 118 to aid in mounting the guide plate 112. For example, in FIGS. 6, 8 and 9, it may be seen that bolts 120 may be guided through washers 122 and then through holes 118 to couple the guide plate 112 to the base 100 in combination with nuts 124. Alternatively (or in addition), other like fasteners or mounting methods (e.g., welding, gluing, clamping, or the like) may be used to position the guide plate 112 proximate lower wrap roll 76.

In certain embodiments, the wrap guide system 110 may further include a lower wrap roll 76 having a series of axially spaced grooves 126 formed about a circumference of the lower wrap roll 76. The grooves 126 may be formed by opposing side walls 128 and a base 130 that together define a cavity having a rectangular cross-section taken along the axis of rotation "A" of lower wrap roll 76. The grooves 126 may be sized to receive at least a portion of the fingers 116. As such, the guide plate 112 may be positioned such that the distal sections 116b of the fingers 116 extend at least partially into the grooves 126. In another aspect, the angle ($\alpha$) at which the distal section 116b is bent relative to the proximal section 116a may enable the fingers 116 to approach along a trajectory tangent to a surface of the lower wrap roll 76. In the case that the fingers 116 are positioned in the grooves 126, the fingers 116 may approach along a trajectory (or at an angle) tangent to a surface of the base 130 of the grooves 126. The grooves 126 may be sized to receive the fingers 116 of the guide plate 112 without necessarily contacting the fingers 116. For example, the width of the fingers 116 may be about equal to or narrower than the width of the grooves 126, or more particularly, the distance between the side walls 128. Moreover, a thickness dimension of the fingers 116 may be about equal to or less than the depth of the grooves 126. In some embodiments, the fingers 116 may be sized such that at least a portion of the distal ends of the fingers 116 may reside entirely within the grooves 126 without extending radially outward past the outer surface of the lower wrap roll 76.

In the case that the fingers 116 contact the lower wrap roll 76 during a wrapping operation, the orientation of the fingers 116 relative to the lower wrap roll 76 may be selected to prevent or reduce vibrations or mechanical disturbances (e.g., shaking, shuddering, rattling, and the like). The discovery has been made that mechanical disturbances may be attenuated given the arrangement of the fingers 116 and the grooves 126 in the lower wrap roll 76 as compared with an arrangement of the fingers 116 that may not be tangent to the surface of the lower wrap roll 76 or the base 130 of the grooves 126. In addition, the distal ends of the fingers 116 may be shaped to further attenuate or otherwise mitigate the potential for mechanical disturbances in the case that the fingers 116 contact a portion of the lower wrap roll 76. The fingers 116 may have a generally rectangular profile as viewed, for example, in FIG. 11. However, one or more portions of the fingers 116 may be tapered, rounded or beveled to minimize catching or dragging of the fingers 116 on the surfaces of the grooves 126. For example, the ends of the distal section 116*b* that extend into the grooves 126 are rounded or beveled, which may further reduce mechanical disturbances as compared with fingers 116 having squared edges.

Figure 10:
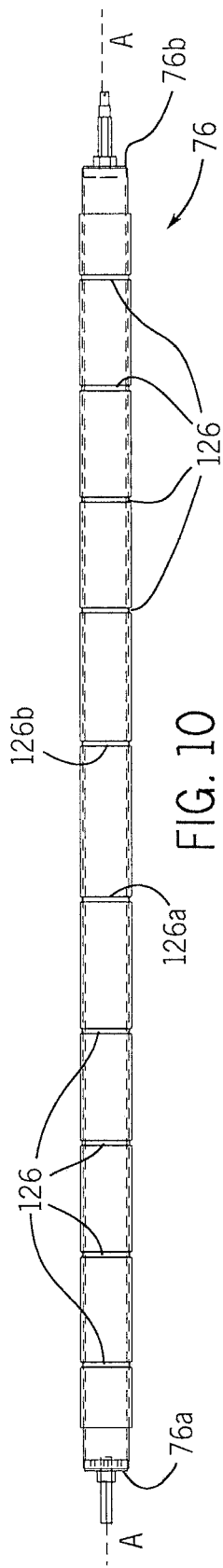
FIG. 10 is a bottom view of an example lower wrap feed roll of the wrapping system of FIG. 4 shown in isolation.
Figure 11:
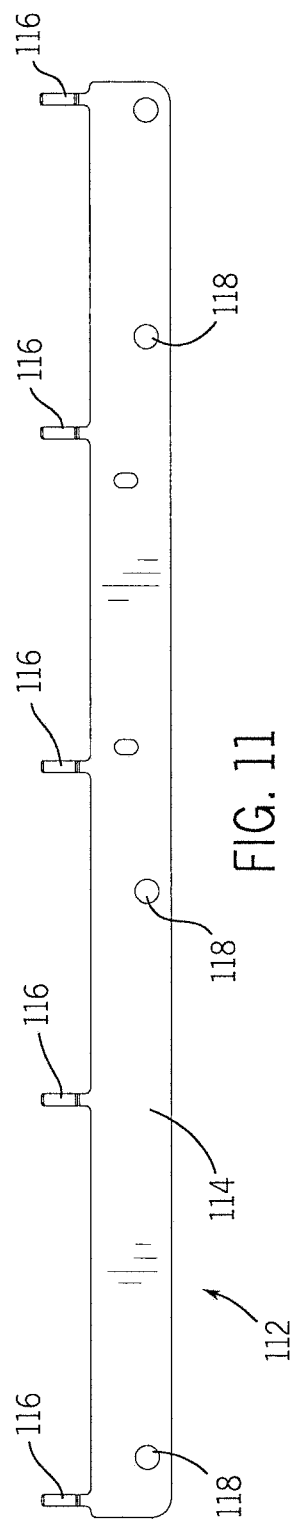
FIG. 11 is a bottom view of an example guide plate of the wrapping system of FIG. 4 shown in isolation.
Figure 12:
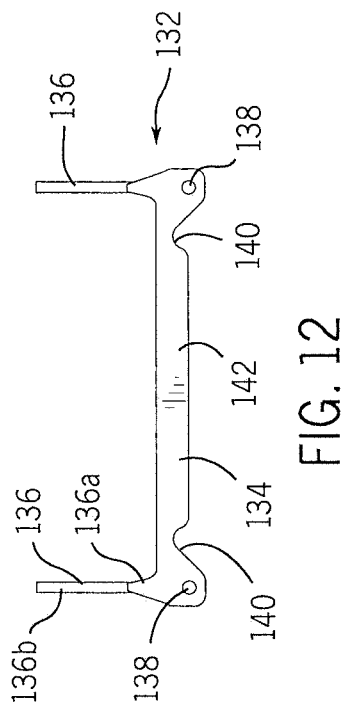
FIG. 12 is a bottom view of another example guide plate shown in isolation.

Referring now in particular to FIGS. 10-12, various designs may be suitably employed in providing the wrap guide system 110. Aspects of the wrap guide system 110 that may be varied include the number and the length of the guide plates 112, the number and the relative spacing of the fingers 116, the number and the relative spacing of the grooves 126 in the lower wrap roll 76, and the like. In the embodiment shown in FIGS. 10 and 11, the guide plate 112 includes five fingers 116 spaced equidistantly apart along the length of the body 114. Further the body 114 is dimensioned such that two identical guide plates 112 may be positioned consecutively along the length of a single lower wrap roll 76 as shown in FIG. 7. For example, a first guide plate 112 may be mounted such that each one of the five fingers 116 extends into a respective one of the first five grooves 126 (including groove 126*a*) spaced from a first end 76*a* of the lower wrap roll 76. Similarly, a second guide plate 112 may be mounted such that each one of the five fingers 116 extends into a respective one of the first five grooves 126 (including groove 126*b*) spaced from a second end 76*b* of the lower wrap roll 76.

In some embodiments, the spacing between each of the grooves 126 (including grooves 126*a* and 126*b*) on the lower wrap roll may vary. For example, in the embodiment shown in FIG. 10, each of the first five grooves with respect to either end 76*a* or end 76*b* of lower wrap roll 76 are equally spaced relative to one another. However, the spacing between the innermost grooves 126*a* and 126*b* is relatively greater than the spacing between the other adjacent pairs of the grooves 126. Accordingly, it may be useful to vary the spacing between the first and second guide plates 112 in order to vary the spacing between the grooves 126. Alternatively (or in addition), it may be useful to vary the relative spacing of the individual fingers 116 of a given guide plate 112. For example, the spacing between the fingers 116 may be regular, semi-regular, non-uniform, or otherwise irregular.

In some embodiments, it may be useful to provide guide plates 112 of varying dimensions. Referring to FIG. 12, another embodiment of a guide plate 132 includes a body 134 having two fingers 136 and two holes 138 for mounting or otherwise positioning the guide plate 132. In one aspect, a profile of the body 134 as viewed in FIG. 12 may be different from the body 114. For example, the body 134 may include indentations or cutouts 140 located towards the ends of the body 134. However, a central section 142 of the body 134 may be generally rectangular as in the case of the body 114. In another aspect, each of the two fingers 136 may be spaced apart at respective ends of the body 134. The fingers 136 may have include a bend defining a proximal section 136*a* and a distal section 136*b*. The proximal section 136*a* may extend outwards from the body 134 in the plane of the guide plate 132. Further, the distal section 136*b* may be bent at an angle to the proximal section 136*a*. The angle may be similar to the angle (α) with respect to the fingers 116. In comparison with the guide plate 112, the guide plate 132 may have a body 134 with a length that is less than the length of the body 114. For example, the spacing between adjacent fingers 136 may be about the same as the spacing between adjacent fingers 116. Therefore, the length of the body 134 may be about equal to the spacing between adjacent fingers 116.

In some embodiments, it may be useful to provide a wrap guide system having two or more identical guide plates. As described above, it may be useful to provide a pair of guide plates 112 for use with lower wrap roll 76. By comparison, it may be useful to provide a plurality of guide plates 132 for use with the lower wrap roll 76 or another wrap roll having a different configuration of grooves. In the case of a lower wrap roll having 10 spaced apart grooves as in the case of lower wrap roll 76, it may be useful to provide five identical guide plates 132 that may be spaced adjacent one another along the length of the roll. In one aspect, the guide plates 132 may be equally spaced such that the spacing between each of the fingers 136 is constant (i.e., the spacing between fingers 136 for a guide plate 132 is equal to the spacing between fingers on adjacent guide plates). In another aspect, the guide plates may be equally spaced such that the spacing between fingers 136 on a guide plate 132 is greater or less than the spacing between fingers on adjacent guide plates. Other spacing arrangements for guide plates 132 may be used in addition to or instead of the aforementioned arrangements.

In yet another aspect, it may be useful to provide a wrap guide system including two or more different types of guide plates. For example, a wrap guide system may include at least one guide plate 112 in combination with at least one guide plate 132. Guide plates of varying lengths with varying numbers of fingers or varying finger spacing arrangements may be suitable used either alone or in combination with one or more of the aforementioned guide plates. By comparison, it may be useful to provide a wrap guide system including a single guide plate. For example, a single guide plate may be provided for use with the lower wrap roll 76 having the arrangement of grooves 126 as shown at least in FIG. 10. The body of the guide plate may have a length of about the distance between the two outermost grooves 126 (i.e., the grooves closest to the first end 76*a* and the second end 76*b*). Ten fingers may be spaced along the length of the body corresponding with the spacing of the grooves 126 on the lower wrap roll 76.

Referring again generally to FIGS. 6-11, the wrap guide system 110 may be used to prevent or reduce the occurrence of a wrap mis-feed event. As noted, if the wrapping material 66 is mis-fed into the module-forming chamber 36 or does not reach the module-forming chamber 36, a module 58 may be ejected from the module-forming chamber 36 in an unwrapped or improperly wrapped state, which may expose the module 58 to debris, moisture, or other potentially harmful conditions. Further, the unwrapped module 58 may be more difficult to handle or transport as compared with a wrapped module 58'. Accordingly, the wrap guide system 110 may be provided to aid in the proper feeding of the wrapping material 66 into the module-forming chamber 36.

Figure 9:
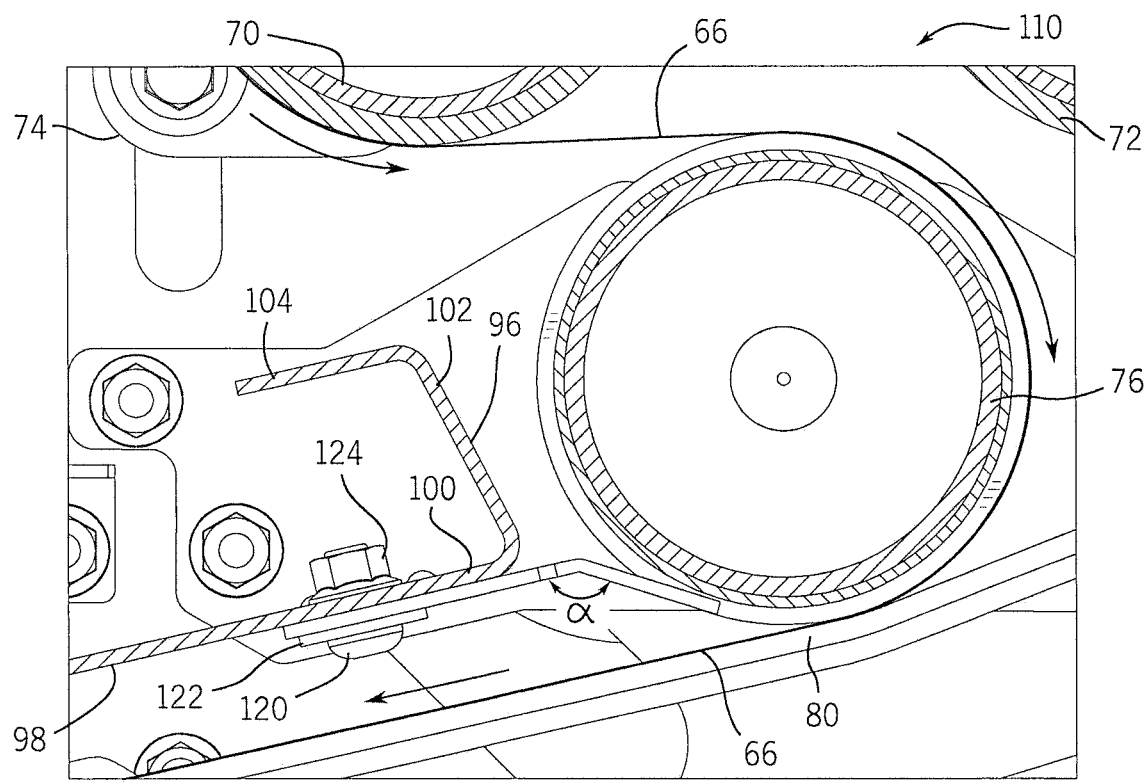
FIG. 9 is an enlarged side view thereof taken along line 9-9 of FIG. 4.

In operation, a leading edge of the wrapping material 66 may travel from the supply roll 64, around the forward face of the front upper wrap roll 70, and around the rear face of the lower wrap roll 76 as shown, for example, in FIGS. 4, 5 and 9. As the leading edge of the wrapping material 66 travels (e.g., clockwise) around the outer surface of the lower wrap roll 76, the leading edge of the wrapping material 66 may pass over the distal sections 116*b* of the fingers 116. The wrapping material 66 may not catch or become obstructed by the distal sections 116*b* as these portions of the fingers 116 are received within the grooves 126 of the lower wrap roll 76 such that at least the ends of the distal sections 116*b* are positioned about flush with, or radially inward from, the outer surface of the lower wrap roll 76.

As the leading edge of the wrapping material 66 continues around the lower wrap roll 76, the wrapping material 66 is guided away from the surface of the lower wrap roll 76 by the fingers 116 and the guide plate 112, in general. In one aspect, the guide plate 112 may prevent or impede the wrapping material 66 from making a full turn or revolution about the surface of the lower wrap roll 76, thereby reducing the chance that the wrapping material 66 may become caught on or wound around the lower wrap roll 76. In another aspect, the wrapping material 66 is bounded above by the guide plate 112 (which is mounted beneath the wrap guide 96) and below by the wrap conveyor arrangement 78. Accordingly, as the wrapping material 66 is guided off of the lower wrap roll 76 by the guide plate 112, the wrapping material 66 may be guided by the wrap feed belts 80 beneath the fingers 116 and then the body 114 of the guide plate 112. Thereafter, the wrapping material 66 may pass beneath the runners 98 in travelling toward the module-forming chamber 36.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

Each reference identified in the present application is herein incorporated by reference in its entirety.

What is claimed is:

1. A wrap guide arrangement having a source of a wrapping material and a wrap conveyor arrangement for guiding the wrapping material from the source to the conveyor arrangement to wrap a module of crop material, the arrangement comprising:
    a wrap roll extending along an axis of rotation and having an outer circumference receiving the wrapping material, wherein the wrap roll has at least one groove formed in the outer circumference; and
    a guide plate having an axially extending body and at least one finger extending from the body toward the wrap roll, the at least one finger having a distal section terminating at a distal end;
    wherein the distal section of the at least one finger extends along a trajectory tangent to the wrap roll and is disposed, at least in part, within the at least one groove such that the distal section is tangent to the outer circumference of the wrap roll without the distal end of the distal section extending radially outward past the outer circumference of the wrap roll when between the wrap roll and the wrapping material.

2. The arrangement of claim 1, wherein there are a plurality of the fingers spaced apart along the body of the guide plate in a direction of the axis of rotation.

3. The arrangement of claim 1, wherein the at least one groove forms a pair of radial side walls and an annular base having a circumference smaller than the outer circumference of the wrap roll.

4. The arrangement of claim 1, wherein the at least one finger has a proximal section at an angle relative to the distal section.

5. The arrangement of claim 1, wherein the body of the guide plate is planar, and wherein the guide plate body and the proximal section of the at least one finger extend along a plane that intersect the wrap roll.

6. The arrangement of claim 5, wherein there are a plurality of the grooves spaced apart along the wrap roll in a direction of the axis of rotation; and
    wherein there are a plurality of the fingers spaced apart along the body of the guide plate along the direction of the axis of rotation and at least in part received in the plurality of the grooves in the wrap roll.

7. The arrangement of claim 1, further including a second guide plate aligned in a direction of the axis of rotation with the guide plate; and
    wherein the second guide plate includes a second axially extending body having at least one finger extending from the second body toward the wrap roll; and
    wherein at least part of the at least one finger of the second guide plate extends tangent with respect to the outer circumference of the wrap roll between the wrap roll and the wrapping material.

8. The arrangement of claim 1, wherein there are multiple fingers transversely spaced apart and multiple runners transversely spaced apart from each other and from the fingers.

9. The arrangement of claim 1, wherein the guide plate is part of a wrap guide positioned forward of the wrap roll in a feed direction of the wrap material and having at least one runner extending above the wrap conveyor arrangement away from the wrap roll.

10. The arrangement of claim 9, wherein the at least one runner extends away from the wrap roll and above the wrap material opposite the wrap conveyor arrangement to form a ceiling above the wrap material.

* * * * *